(12) United States Patent
Garg (10) Patent No.: US 11,856,133 B2
(45) Date of Patent: Dec. 26, 2023

(54) CONTEXTUAL INFORMATION INFERENCE FOR INCOMING CALLS

(71) Applicant: T-Mobile USA, Inc., Bellevue, WA (US)

(72) Inventor: Parag Garg, Woodinville, WA (US)

(73) Assignee: T-Mobile USA, Inc., Overland Park, KS (US)

( * ) Notice: Subject to any disclaimer, the term of this patent is extended or adjusted under 35 U.S.C. 154(b) by 709 days.

(21) Appl. No.: 16/780,692

(22) Filed: Feb. 3, 2020

(65) Prior Publication Data
US 2021/0243296 A1     Aug. 5, 2021

(51) Int. Cl.
*H04M 3/42*     (2006.01)
*H04W 4/02*     (2018.01)
*G06N 5/04*     (2023.01)
*G06N 5/022*    (2023.01)
*G06N 20/00*    (2019.01)

(52) U.S. Cl.
CPC ........ *H04M 3/42068* (2013.01); *G06N 5/022* (2013.01); *G06N 5/04* (2013.01); *G06N 20/00* (2019.01); *H04W 4/02* (2013.01); *H04M 2203/2072* (2013.01); *H04M 2250/12* (2013.01)

(58) Field of Classification Search
CPC ..... H04M 3/42068; H04M 2203/2072; H04M 2250/12; H04M 3/42042; H04M 2203/2038; H04M 2242/30; G06N 5/022; G06N 5/04; G06N 20/00; H04W 4/02
See application file for complete search history.

(56) References Cited

U.S. PATENT DOCUMENTS

| | | | |
|---|---|---|---|
| 8,144,850 B2 | 3/2012 | Brown et al. | |
| 8,989,357 B2 | 3/2015 | Quintero et al. | |
| 9,088,882 B2* | 7/2015 | Ferren | H04M 1/72448 |
| 2002/0128033 A1* | 9/2002 | Burgess | G06F 1/3209 |
| | | | 455/528 |
| 2003/0046421 A1* | 3/2003 | Horvitz | H04L 51/00 |
| | | | 709/206 |
| 2003/0112944 A1* | 6/2003 | Brown | H04M 3/42 |
| | | | 379/201.01 |
| 2010/0023472 A1* | 1/2010 | Loeb | G06Q 10/107 |
| | | | 709/206 |
| 2012/0219133 A1* | 8/2012 | Hawkins | G06Q 10/107 |
| | | | 379/142.04 |
| 2015/0142704 A1* | 5/2015 | London | G06Q 10/10 |
| | | | 706/11 |

(Continued)

*Primary Examiner* — Margaret G Mastrodonato (57) ABSTRACT

User profile data of a caller and time-stamped event data from one or more data sources are received. An incoming call initiated by a caller device of the caller is detected, and device data associated with the caller device that includes a geolocation is received. In response to an initiation of the incoming call, an inference framework is applied to infer a situational context of the caller based on an analysis of the time-stamped event data, the user profile data of the caller, and the device data. The contextual information for the situational context of the caller is sent to the recipient device for presentation via the recipient device. Feedback of a call recipient is received from the recipient device following the presentation. Accordingly, one or more inference rules of the inference framework are modified via a machine-learning algorithm to generate a modified inference framework based on the feedback.

20 Claims, 5 Drawing Sheets

(56) References Cited

U.S. PATENT DOCUMENTS

| | | | | |
|---|---|---|---|---|
| 2016/0165047 A1* | 6/2016 | Gray | ................ | H04M 3/42374 |
| | | | | 379/201.03 |
| 2018/0165589 A1* | 6/2018 | Weinberg | ............... | G06N 7/005 |
| 2020/0389551 A1* | 12/2020 | Vaughn | ............. | H04M 3/42059 |
| 2021/0160368 A1* | 5/2021 | Liang | ....................... | G06N 7/00 |

* cited by examiner

CONTEXTUAL INFORMATION INFERENCE FOR INCOMING CALLS

BACKGROUND

Users of telecommunication devices receive multiple voice calls throughout the day. Caller ID is a feature that enables users to know who a caller is before the user picks up the phone. However, the information provided by a caller ID feature is generally limited. For example, caller ID may show a telephone number and if available, a pre-registered name and/or geographical location associated with the telephone number. In some instances, such information may be sufficient for a user to identify the caller and decide whether to take or reject an incoming call. However, in other instances, such information may provide insufficient context for a user to decide whether to take or reject the call.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques that enable a contextual inference platform of a wireless carrier network to infer a situational context for an incoming call that is placed by a caller at a caller device to a call recipient at a recipient device. The contextual inference platform may infer the situational context based on multiple sources of data, such as user profile data of the caller, device data obtained from the recipient device of the caller, time-stamped event data of events that are relevant to the caller device, and/or so forth. The user profile data may include demographic characteristics of the caller, social relationship information of the caller, subscriber information of the caller with respect to the wireless carrier network, etc. The device data may include sensor data that is detected by one or more sensors of the caller device, such as a geolocation of the caller device, device movement, device acceleration, and/or biometric information of the caller (e.g., pulse rate, blood pressure, body temperature, etc.). The device data may further include application data that is stored on the caller device for which the user consented to share with the contextual inference platform. For example, such application data may include calendar, schedule, and/or appointment information of the caller. The time-stamped event data may include news events, weather events, traffic events, social events, etc. that are available from third-party data sources.

When the caller initiates an incoming call to call recipient, an inference engine of the contextual inference platform may use an inference framework that contains inference rules to analyze the data from the multiple sources to determine the situational context for the incoming call. In some instances, the inference rules may be rules that are manually inputted by a user. In other instances, the inference rules may be rules that have been developed via machine-learning, e.g., supervised learning based on training data. Once the inference engine has inferred a situational context for the incoming calling, the contextual inference platform may direct a call alert function provided by a core network of the wireless carrier network to deliver the contextual information for the situational context to the recipient device. In various embodiments, the call alert function may be configured to deliver the contextual information along with an incoming call notification to the recipient device. In this way, the contextual information (e.g., text and/or graphics) and the incoming call notification (e.g., a triggered ring tone) may be presented concurrently by a user interface of the recipient device. In some instances, the contextual information may include a geolocation of the caller device, data pertaining to one or more time-stamped events (e.g., weather event, news event, etc.) that have been determined by the inference engine to be related to the incoming call, and/or one or more conclusions reached by the inference engine with respect to the incoming call.

Following the delivery of the contextual information to the recipient device, the contextual inference platform may receive feedback regarding the contextual information. In some instances, the contextual inference platform may learn from the core network whether the call recipient answered the incoming call. The decision of the call recipient to answer the call or ignore the call (e.g., decline the call, send the call to voicemail, etc.) may serve as feedback with respect to the effectiveness of the inference rules in the inference framework. In other instances, the contextual inference platform may explicitly direct the recipient device to prompt the call recipient to rate the usefulness and/or accuracy of the contextual information, in which the usefulness and/or accuracy is correlated with the effectiveness of the one or more inference rules. In this way, the feedback is analyzed by a machine-learning engine of the contextual inference platform. Subsequently, the machine-learning engine may automatically adjust the inference rules of the inference framework based on the analysis to create a modified inference framework. In this way, the inference rules of the inference framework may be continuously updated for better predicting the situational context of the caller for subsequent calls made by the caller.

The use of the contextual inference platform to provide context information of an incoming call to a call recipient may enable the call recipient to make a more informed decision as to the importance of the incoming call, the potential subject matter of the incoming call, and whether to reject or to answer the incoming call from the caller. The provision of such useful contextual information to the call recipient may increase user satisfaction of the call recipient with a mobile network operator (MNO) that operates the wireless carrier network. The techniques described herein may be implemented in a number of ways. Example implementations are provided below with reference to the following FIGS. 1-5.

Example Architecture

Figure 1:
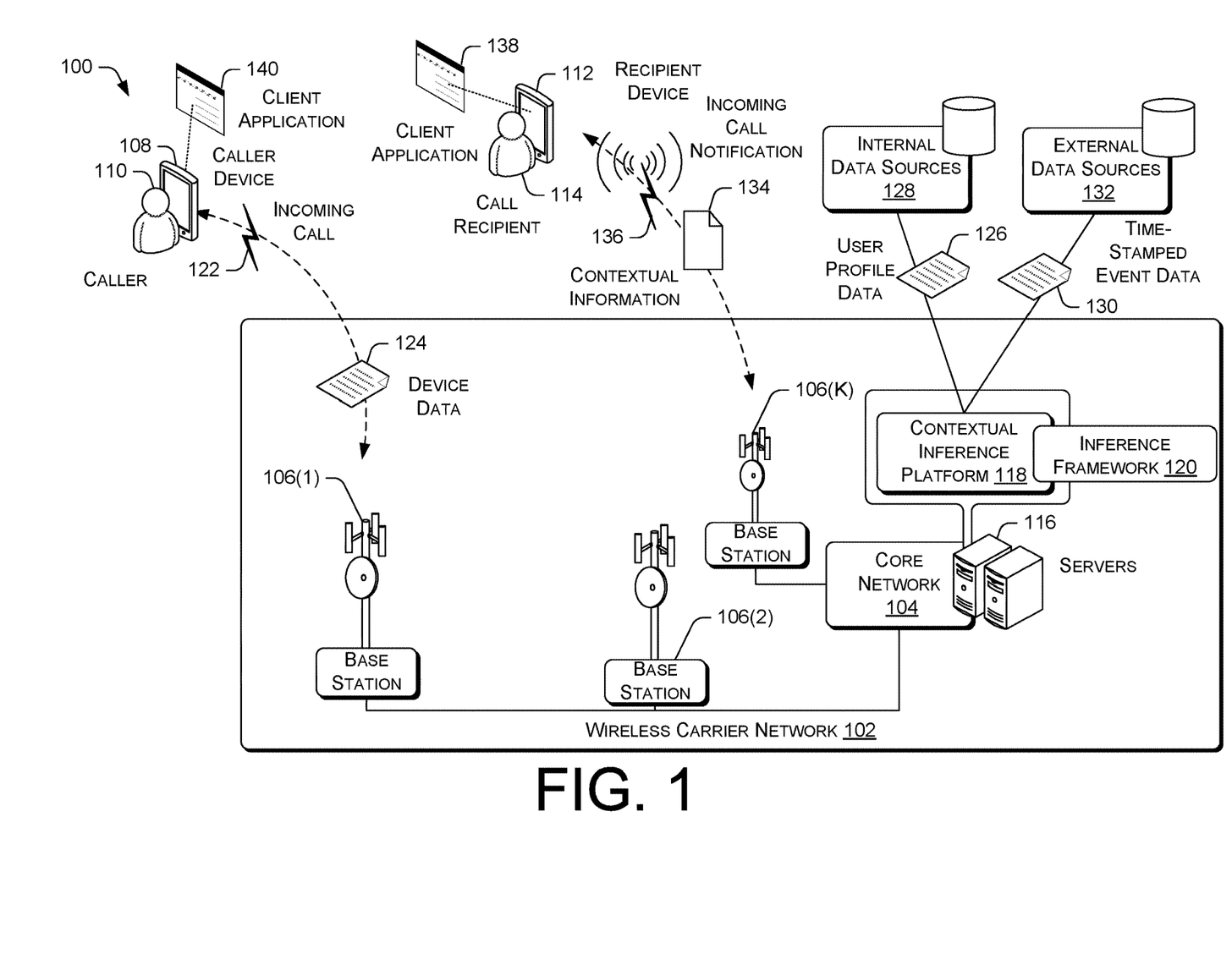
FIG. 1 illustrates an example architecture that enables a wireless carrier network to use a contextual inference platform to generate a situational context for an incoming call made from a caller device to a recipient device.

FIG. 1 illustrates an example architecture 100 that enables a wireless carrier network 102 to use a contextual inference platform to generate a situational context for an incoming call made from a caller device to a recipient device. The wireless carrier network 102 may provide a wide range of mobile communication services, as well as ancillary services and features, to subscribers and associated mobile device users. The wireless carrier network 102 may be operated by a mobile network operator (MNO). In various embodiments, the wireless carrier network 102 may provide wireless communication between multiple user devices. Further, the wireless carrier network 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network 104 by a wide area network (WAN). Each regional portion of the wireless carrier network 102 may include one or more RANs and a regional circuit and/or packet-switched network and associated signaling network facilities. The wireless carrier network 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth.

A RAN of the wireless carrier network 102 may include a number of base stations, such as the base stations 106(1)-106(K), also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network 104. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. The core network 104 may connect to a public packet data communication network, such as the Internet. Data and voice communications via the RANs, the core network, and the Internet may support a variety of telecommunication services through the wireless carrier network 102.

The wireless carrier network 102 may provide telecommunication services to multiple user devices. In some instances, the user devices may include smartphones, tablet computers, embedded computer systems, or any other device that is capable of using the wireless communication services that are provided by the wireless carrier network 102. For example, a caller device 108 of a caller 110 may be in communication with the base station 106(1). Likewise, a recipient device 112 of a call recipient 114 may be in communication with the base station 106(K).

The backend servers 116 of the core network 104 may execute a contextual inference platform 118. The contextual inference platform 118 may use an inference framework 120 to analyze multiple sources of data to provide contextual information for an incoming call that is made by a caller at a caller device and destined for a recipient device of a recipient. In at least one embodiment, the contextual inference platform 118 may provide contextual information for an incoming call 122 that is initiated by the caller 110 to the call recipient 114 based on the data from the multiple sources. In such an embodiment, the multiple sources of data used by the contextual inference platform 118 may include device data 124 from the caller device 108, user profile data 126 from internal data sources 128 of the wireless carrier network 102, and time-stamped event data 130 from external data sources 132. The device data 124 may include device data parameters that represent the sensor data detected by one or more sensors of the caller device 108. These device data parameters may include a geolocation of the caller device, device movement, device acceleration, and/or biometric values of the caller (e.g., pulse rate, blood pressure, body temperature, etc.). For example, the caller device 108 may be equipped with various sensors, such as a proximity sensor, a compass, an accelerometer, biometric sensors, cameras, and/or so forth. Accordingly, the user may consent to sharing these device data parameters with the contextual inference platform 118. The device data 124 may further include application data parameters that are stored in the caller device 108 for which the user consented to share with the contextual inference platform 118. For example, such application parameters may include calendar, schedule, appointment, and/or itinerary parameters of the caller. The application data may be stored by an operating system of the caller device 108, by native applications that are built into the software environment of the caller device 108, by the one or more over-the-top (OTT) applications that are executed in the software environment, and/or so forth. For example, the applications may include a calendar application, an email application, a task list application, a map application, a navigation application, and/or so forth.

The user profile data 126 of the caller 110 may include user characteristics such as demographic characteristics of the caller 110, social relationship information of the caller 110, subscriber information of the caller 110 with respect to the wireless carrier network 102, and/or so forth. The demographic characteristics may include the age, gender, etc. of the caller 110. The social relationship information may include the name and contact information (e.g., telephone numbers), relationship type (e.g., family member, co-worker, friend, employee vs. manager, etc.) for the contacts of the caller 110. In some instances, the contacts of the caller 110 are also subscribers of the wireless carrier network 102. The subscriber information may include device information and user account information. The device information for a user device may indicate the technical capabilities, feature settings, and operational statuses of user devices. For example, device information for the caller device 108 may indicate that Wi-Fi calling is enabled on the user device or that the user device is capable of using a specific communication band provided by the wireless carrier network 102. In other examples, the device information for the caller device 108 may indicate that Wi-Fi calling is disabled on the user device, a developer mode is active on the user device, a location tracking service is active on the user device, and/or so forth. The user account information for the caller 110 may include account details of the caller 110, such as account type, billing preferences, service plan subscription, payment history, call history (e.g., call log of date/time of calls, geolocation of calls, minutes of talk time used for each call, etc.), amount of data consumed, time/date of the data consumption, customer support history, and/or so forth. The account details may also indicate an account relationship of the caller 110 to one or more subscribers. For example, the account details may indicate that the caller 110 is a secondary account holder on the account of another primary account holder. In another example, the account details may indicate that the caller 110 is a primary account holder, and one or more other subscribers are secondary account holders of the caller 110. The caller 110 may consent to provide the user profile data 126 to the wireless carrier network 102 in several scenarios, such as during initial account setup, purchasing of new user devices, set up of user devices for use on the wireless carrier network, subscription to services provided by the wireless carrier network, customer support exchanges with a customer service agent, etc. In some embodiments, the user profile data 126 of the caller 110 may also include social media data obtained by the wireless carrier network 102. The wireless carrier network 102 may obtain the social media data from social media portals (e.g., websites, blogs, microblogs, etc.) that the caller 110 permits the wireless carrier network 102 to access. Alternatively, the wireless carrier network 102 may use a machine-learning search algorithm (e.g., a web crawler bot) to obtain publicly-accessible social media data from various social media portals used by the caller 110 and other subscribers of the wireless carrier network 102.

The time-stamped event data 130 may include news events, weather events, traffic events, social events, etc. that are available from third-party data sources. Such third-party data sources may include online portals, digital information feeds, web-based services, etc. that are operated by governmental agencies, news service organizations, private organizations, social media platforms, etc. The time-stamp for the data associated with an event may indicate when the event initiated occurred, a duration of the event, and/or when the event ended. Accordingly, the contextual inference platform 118 may include a machine-learning algorithm that automatically detects natural or man-made events that may affect different geographical locations at different times. For example, such events may include a severe weather storm, a popular sporting event, a major traffic incident, and/or so forth.

Thus, when the caller 110 initiates the incoming call 122 to the recipient device 112 of the call recipient 114, the contextual inference platform 118 may use an inference framework that contains inference rules to analyze the data from the multiple sources to determine the situational context for the incoming call 122. Once the inference engine has inferred a situational context for the incoming calling, the contextual inference platform may direct a call alert function provided by the core network 104 of the wireless carrier network 102 to deliver the contextual information 134 for the situational context to the recipient device 112. In various embodiments, the call alert function may be configured to deliver the contextual information 134 along with an incoming call notification 136 to the recipient device. In this way, the contextual information 134 (e.g., text and/or graphics) and the incoming call notification (e.g., a triggered ring tone) may be presented concurrently by a user interface of the recipient device 112. The contextual information 134 and the incoming call notification may be provided by one or more client applications of the recipient device 112, such as the client application 138. The one or more client applications may include a telephone application, a productivity application, a social media application, some other native application, or some other third-party OTT application. In some embodiments, the contextual information 134 and the incoming call notification may be concurrently presented by a single client application (e.g., the telephony application) of the recipient device 112. In other embodiments, a first client application of the recipient device 112 may present the incoming call notification while a second client application of the recipient device 112 may concurrently present the corresponding contextual information. In such embodiments, the first client application may be a native application, while the second client application may be a third-party OTT application. For example, a telephony application of the recipient device 112 may present an incoming call notification in a first notification window on a user interface, while a social media application may concurrently provide the corresponding contextual information in a second notification window on the user interface (e.g., the contextual information that the current day is the caller's birthday).

In some instances, the contextual information 134 may include the geolocation of the caller device, data pertaining to one or more time-stamped events (e.g., weather event, news event, etc.) that have been determined by the inference engine to be related to the incoming call, and/or conclusions reached by the inference engine with respect to the incoming call. For example, when the caller 110 initiates the incoming call 122 to the call recipient 114, the contextual inference platform 118 may determine that the caller 110 is supposed to be at a meeting location in 15 minutes for a meeting with the call recipient 114. However, the contextual inference platform 118 may further determine that the caller 110 is more than 15 minutes away based on a current geographical location of the caller, a current movement speed of the caller, and traffic conditions between the current geographical location and the meeting location. Accordingly, the contextual inference platform 118 may conclude that the caller 110 is going to be late for the meeting. In such an event, the contextual inference platform 118 may deliver the contextual information 134 that includes a current geolocation of the caller 110 and a conclusion that the caller 110 is likely to be late for the meeting. The contextual information 134 is delivered to the recipient device 112 for presentation along with the incoming call notification 136 on the recipient device 112.

In another example, when the caller 110 initiates the incoming call 122 to the call recipient 114, the contextual inference platform 118 may determine that the caller 110 is supposed to be at a school at the current date and time. Further, the contextual inference platform 118 may further determine that the call recipient 114 is a parent of the caller 110 and a current geolocation of the caller 110 is different from a location of the school. Accordingly, the contextual inference platform 118 may deliver contextual information 134 that includes a current geolocation of the caller 110 and a conclusion that the caller is absent from the school. In an additional example, when the caller 110 initiates the incoming call 122 to the call recipient 114, the contextual inference platform 118 may determine that the caller 110 is currently at a geolocation that is affected by an emergency incident, e.g., a severe weather event. The contextual inference platform 118 may further determine that the biometric data of the caller 110 indicates that the caller 110 is experiencing abnormal biometric readings (e.g., an elevated heart rate). Accordingly, the contextual inference platform 118 may deliver contextual information 134 that includes a current geolocation of the caller 110 and a conclusion that the caller 110 is being impacted by the emergency incident.

In at least one embodiment, the caller 110 may configure the type of information regarding the caller 110 that the contextual inference platform 118 is able to share with particular call recipients. For example, the caller 110 may use a client application 140 on the caller device 108 to configure whether a current geolocation of the caller 110, biometric values of the caller 110, sensor data of the caller device 108, etc. can be shared with one or more specific call recipients. In such an example, the client application 140 may be a native telephony application of the caller device 108, an OTT application supplied by the wireless carrier network 102, or some other application installed on the caller device 108. Such configurations may be stored in a configuration store of the contextual inference platform 118.

Example Contextual Inference Framework

Figure 2:
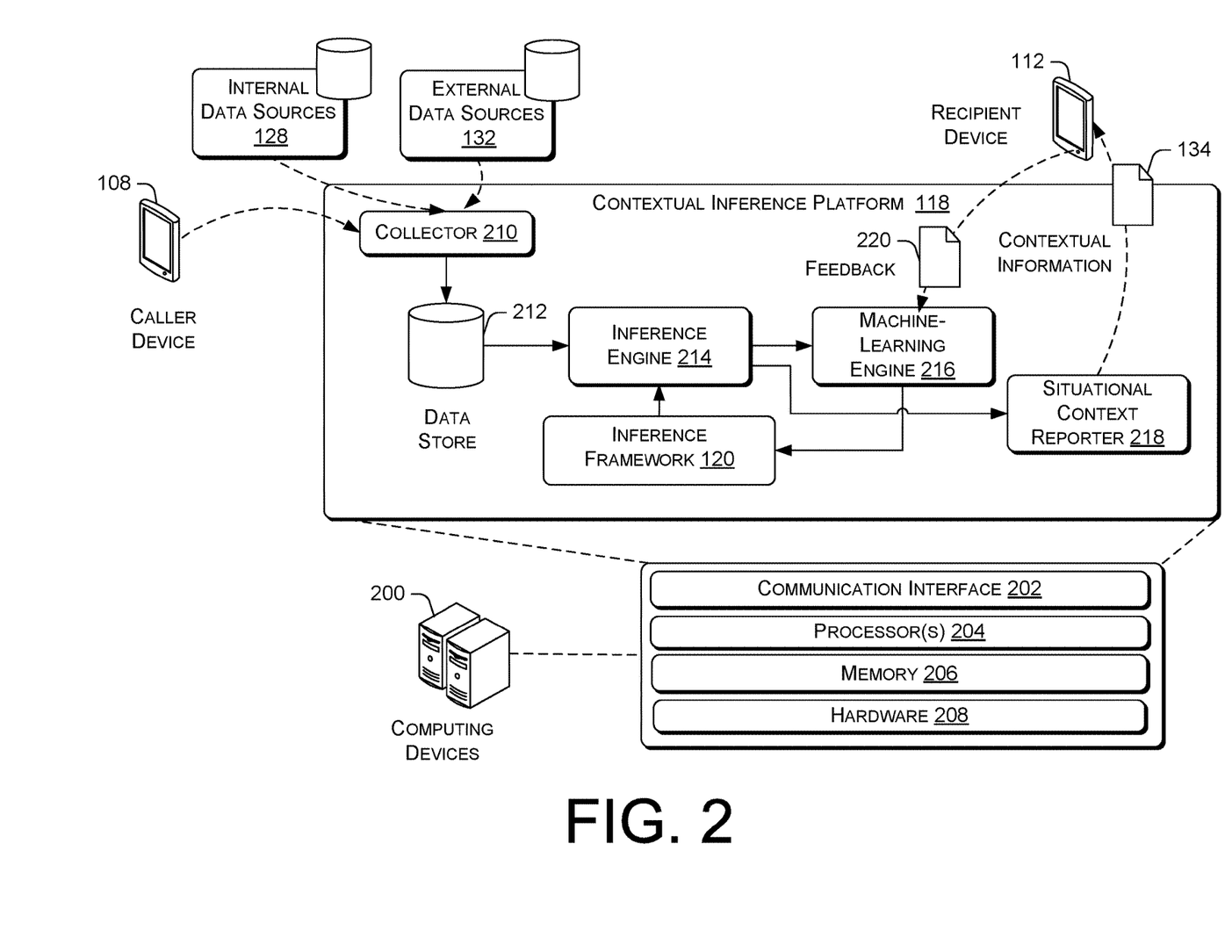
FIG. 2 is a block diagram showing various components of one or more illustrative computing devices that support the contextual inference platform.

FIG. 2 is a block diagram showing various components of one or more illustrative computing devices that support the contextual inference platform. The contextual inference platform 118 may be implemented by one or more computing devices 200. For example, the one or more computing devices may include the backend servers 116. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 200 or components thereof may be virtual computing devices in the form of virtual machines or software containers that are hosted in a computing cloud. The contextual inference platform 118 may include a collector 210, a data store 212, an inference engine 214, a machine-learning engine 216, and a situational context reporter 218. These software components may be implemented using routines, program instructions, objects, and/or data structures that are executed by the processors 204 to perform particular tasks or implement particular abstract data types.

The collector 210 may check for and retrieve data from multiple data sources, such as caller devices (e.g., caller device 108), the internal data sources 128, and external data sources 132 in response to requests from the inference engine 214. In other embodiments, the collector 210 may use a scheduler to check for and retrieve data from the multiple data sources. The scheduler may perform the checking and retrieval based on configurable policies. For example, a configurable policy may specify the source data location, frequency of data retrieval, data retention period, and data disposal date/time. In various embodiments, the collector 210 may employ data adapters to obtain data files from the data sources. The data adapters may use file transfer protocol (FTP), Hypertext Transfer Protocol (HTTP) posts, direct network infrastructure element connection, and/or other data transfer protocols to retrieve the data files from the data sources. In some embodiments, the collector 210 may perform data integrity tests to verify the integrity of the received data files. In some instances, the data files that are received by the collector 210 may contain encrypted data. Accordingly, the collector 210 may use an asymmetric or symmetric encryption algorithm to decrypt the data. The collector 210 may further merge data from multiple data files, such that the merged data may be fed into the inference engine 214 for analysis.

The collector 210 may perform retrieval of data that is relevant to a particular caller following user consent to share the data. For example, the collector 210 may direct a client application (e.g., the client application 140) to present a consent interface to a corresponding caller (e.g., the caller 110). The consent interface may enable the caller to grant permission for the collector 210 to retrieve specific data pertaining to the caller by providing an affirmative input, such as clicking on a checkbox, tapping a consent button, moving a virtual switch from an off position to an on position, and/or so forth. In some embodiments, the consent interface may further enable the caller to designate specific call recipients that are allowed to receive specific data pertaining to the caller. Such designation may be performed based on specific telephone numbers of the call recipients, a relationship of the call recipient to the caller, and/or so forth. For example, a caller may opt to share a geolocation of the caller with a call recipient that is a family member, but not with a call recipient that is a co-worker. In another example, Alternatively or concurrently, the caller may also use the consent interface to configure time-dependent and/or location-dependent sharing of certain data. For example, a caller may opt-in to share work-related calendar information with co-workers only during work hours, only provide geolocation information that is within a predetermined proximity to a known workplace during work hours, and/or so forth. In some instances, the collector 210 may be able to retrieve or share data on certain callers based on their relationship to other subscribers of the wireless carrier network 102. For example, the collector 210 may collect data (e.g., geolocation, calendar information, etc.) on a caller who is a minor for sharing with a call recipient who is a parent or guardian of the minor when it is legal to do so. While data is described herein as being collected by the collector 210 from callers, the term callers in this context may refer to all subscribers of the wireless carrier network 102, as call recipients can also act as callers in different instances.

The data that is collected by the collector 210 for individual callers may be stored in the data store 212. For example, the data store 212 may include one or more databases, such as relational databases, object databases, object-relational databases, and/or key-value databases that store the data retrieved for the individual callers. The stored data may be indexed based on the identifiers assigned by the wireless carrier network 102 to the subscribers, such as telephone numbers (e.g., Mobile Station International Subscriber Directory Numbers (MSISDNs)), International Mobile Subscriber Identities (IMSIs), and/or other subscriber identifiers. In some embodiments, the collector 210 may retrieve data for a caller from the internal data sources 128, the external data sources 132, and a caller device of the caller in response to a request from the inference engine 214. The inference engine 214 may send the request following an initiation of an incoming call from the caller device. In other embodiments, the collector 210 may retrieve data from the internal data sources 128 and the external data sources 132 at regularly scheduled intervals, while retrieving the device data from a caller device in response to a request from the inference engine 214.

The inference engine 214 may be notified by the core network 104 of the wireless carrier network 102 of an incoming call that is initiated by a caller device for a recipient device. The notification may include a telephone number of the caller device, a telephone number of the recipient device, a time/date of the call initiation, and/or so forth. Accordingly, the inference engine 214 may use such identification information to retrieve data that is associated with the caller and/or the call recipient from the data store 212. Alternatively, or concurrently, the inference engine 214 may use such identification information to retrieve data directly from a data source or a device via the collector 210.

Subsequently, the inference engine 214 may use an inference framework, such as the inference framework 120, to analyze the data of the caller to determine the situational context for an incoming call made by the caller to the recipient device of a call recipient. In various embodiments, the inference engine 214 may be triggered by a call notification function of the core network 104 to perform the analysis for a particular caller (e.g., the caller 110) following the initiation of an incoming call (e.g., the incoming call 122) by the particular caller to a recipient device (e.g., the recipient device 112) of a call recipient (e.g., the call recipient 114).

The inference framework 120 may contain inference rules for inferring the situational context for an incoming call. In some instances, the inference rules may be rules that are manually inputted by a user. In other instances, the inference rules may be rules that have been developed via machine-learning, e.g., supervised learning based on training data. The inference rules may include inference rules that are configured to assign a statistical weight to a certain time-stamped event, sensor data related to the caller, or a user characteristic in the user profile data of the caller. Other inference rules may rank a relevance of a first piece of data based on whether one or more other pieces of data fit historical trends or other criteria. For example, if a family member is a caller who is calling from a geolocation that does not fit a travel pattern of the caller, or from a known geolocation at a call time that does not fit a historical call pattern of the caller, an inference rule may rank a relevance of any time-stamped event associated with that geolocation above other data. In another example, when an incoming call is initiated by a caller device within a predetermined distance of a geolocation that is experiencing a time-stamped event (e.g., a traffic event), an inference rule may rank the relevance of the time-stamped event above the relevance of other data (e.g., other traffic events). In an additional example, an inference rule may rank a user characteristic (e.g., a heart rate) of the caller as being of higher relevance than other data (e.g., an ambient air temperature) when an incoming call is initiated by the caller at a geolocation that is within an area designated by the caller and/or the call recipient as an alert critical area (e.g., a hospital, a police station, etc.).

Accordingly, the inference engine 214 may apply the inference framework 120 via a logical computing algorithm, a cognitive network algorithm, a machine-learning algorithm, and/or a statistic modeling algorithm to the data relevant to a caller. Accordingly, the inference engine 214 may generate one or more inferences, i.e., contextual information, for a situational context of the caller. For example, the inferring of a situational context may include selecting a time-stamped event for presentation on a recipient device based on a relevance rank value of the time-stamped event being higher than at least one relevance rank value of one or more other time-stamped events. Alternatively, or concurrently, the inferring of a situational context may include selecting a conclusion for presentation on a recipient device based on a confidence value of the conclusion being higher than at least one confidence value of one or more other conclusions. The inference engine may use the statistical modeling algorithm to calculate the confidence values following the use of one or more other algorithms to derive the conclusions. In another example, the inferring of the situational context may include using the statistical modeling algorithm to correlate a device data parameter to a time-stamped event. In this way, the inference engine 214 may generate the contextual information 134 for the incoming call 122 that is made from the caller device 108 to the recipient device 112.

Once the inference engine 214 has inferred a situational context for the incoming calling, the inference engine 214 may send the corresponding contextual information to the machine-learning engine 216 and the situational context reporter 218. In turn, the situation context reporter 218 may direct a call alert function provided by the core network 104 of the wireless carrier network 102 to deliver the contextual information for the situational context to the recipient device. In various embodiments, the situational context reporter 218 may format the one or more inferences into contextual information for delivery by the call alert function. For example, the situational context reporter 218 may format the inferences into contextual information in the form text and/or graphics for delivery by the call alert function.

In some embodiments, the call alert function of the core network 104 may be configured to deliver the contextual information along with an incoming call notification to the recipient device. In this way, the contextual information (e.g., text and/or graphics) and the incoming call notification (e.g., a triggered ring tone) may be presented concurrently by a user interface of the recipient device (e.g., the recipient device 112). In such embodiments, the user interface may be presented by one or more client applications (e.g., client application 138) on the user device. Accordingly, the call alert function of the core network 104 may include program logic that enables the function to interface with various type of applications, such as a telephony application, a productivity application, a social media application, and/or so forth. For example, the program logic of the call alert function may determine based on pre-stored configuration settings whether the incoming call notification and the corresponding contextual information are to be presented by the same client application or different client applications. For example, a configuration setting may indicate that the incoming call notification and the corresponding contextual information are to be presented by a native telephony application. In another example, a configuration setting may indicate that the incoming call notification is to be presented by a native telephony application, while the corresponding contextual information is to be presented by a different third-party application (e.g., social media application). Accordingly, the program logic of the call alert function may call an application program interface (API) of each corresponding client application with the incoming call notification and/or the corresponding contextual information.

In some instances, the contextual information may include the geolocation of the caller device, data pertaining to one or more time-stamped events (e.g., weather event, news event, etc.) that have been determined by the inference engine to be related to the incoming call, and/or conclusions reached by the inference engine with respect to the incoming call. In other embodiments, a recipient device of the call recipient may be roaming on a third-party carrier network other than the wireless carrier network 102. In such embodiments, the situational context reporter 218 may format the contextual information into a message, such as a short message service (SMS) message, a multimedia messaging service (MMS) message, and/or a rich communication service (RCS) message, for delivery to the recipient device via the third-party carrier network.

The machine-learning engine 216 may use the feedbacks from a recipient device to refine an inference framework that is used to generate the corresponding contextual information for delivery to the recipient device. For example, the machine-learning engine 216 may use the feedback 220 from the recipient device 112 to refine the inference framework 120 that is used to generate the contextual information 134 for the recipient device 112. The feedback may include passive feedback and/or active feedback. With respect to passive feedback, the machine-learning engine 216 may learn from the core network 104 whether the call recipient 114 answered the incoming call 122 after receiving the contextual information 134. The decision of the call recipient 114 to answer the incoming call 122 or ignore the incoming call 122 (e.g., decline the call, send the call to voicemail, etc.) may serve as a rating of the effectiveness of the one or more inference rules used to generate the contextual information 134. For example, when the call recipient 114 answers the incoming call 122, the machine-learning engine 216 may determine that the contextual information was accurate, and the one or more inference rules were effective. Conversely, when the call recipient 114 declines the incoming call 122, the machine-learning engine 216 may determine that the contextual information was inaccurate, and the one or more inference rules were ineffective.

With respect to active feedback, the machine-learning engine 216 may direct a client application on the recipient device to prompt a call recipient to rate the usefulness and/or accuracy of the contextual information (e.g., the contextual information 134), in which the usefulness and/or accuracy is correlated with the effectiveness of the one or more inference rules used to generate the contextual information. For example, the rating may be a binary rating in which the call recipient is prompted to answer "yes" or "no" with respect to the usefulness and/or accuracy of the contextual information. In such an example, a "yes" response results in the machine-learning engine 216 determining that the one or more corresponding inference rules are effective. Conversely, a "no" response results in the machine-learning engine 216 determine that the one or more corresponding inference rules are ineffective. In another example, the call recipient may be prompted to provide a numerical rating that is selected from a fixed numerical scale, e.g., 3 out of 5, 4 out of 5, etc. In such an example, the machine-learning engine 216 may be configured to deem a numerical rating given to the contextual information that is at or above a predetermined value threshold as indicating that the one or more corresponding inference rules are effective. Conversely, the machine-learning engine 216 may deem a numerical rating given to the contextual information that is below the predetermined value threshold as indicating that the one or more corresponding inference rules are ineffective.

The machine-learning engine 216 may use a machine-learning algorithm to adjust one or more inference rules that are determined to be ineffective. In some instances, the adjustment involves adjusting the statistical weights that are assigned to different data by the inference rules. For example, an inference rule may be modified to assign a greater statistical weight to a first sensor data value (e.g., blood pressure) while assigning lesser statistical weight to a second sensor data value (e.g., geolocation). In other instances, an inference rule may be modified to assign a piece of data to a higher relevance rank when a second additional piece of data is detected instead of a first piece of additional data. For example, the inference rule may be modified to assign a higher relevance to a geolocation of recipient during daylight hours than during night hours. In other words, an inference value may be modified by increasing or decreasing a relevance rank value or a statistical weight value assigned to a time-stamped event, a user characteristic in the user profile data of the caller, or an environmental parameter in the sensor data associated with the caller by an inference rule. Such adjustment of the one or more inference rules may result in a modified inference framework for a particular caller. Over a period of time, the use of the machine-learning engine 216 to modify an original inference framework (e.g., inference framework 120) may result in the generation of multiple custom inference frameworks, in which each inference framework is custom-tailored for application with respect to a particular caller or a group of callers for future calls initiated by such caller or callers. The machine-learning engine 216 may store the multiple inference frameworks that are created in the data store 212, in which each inference framework may be tagged with an identifier to indicate the caller to which the inference framework corresponds.

Figure 3:
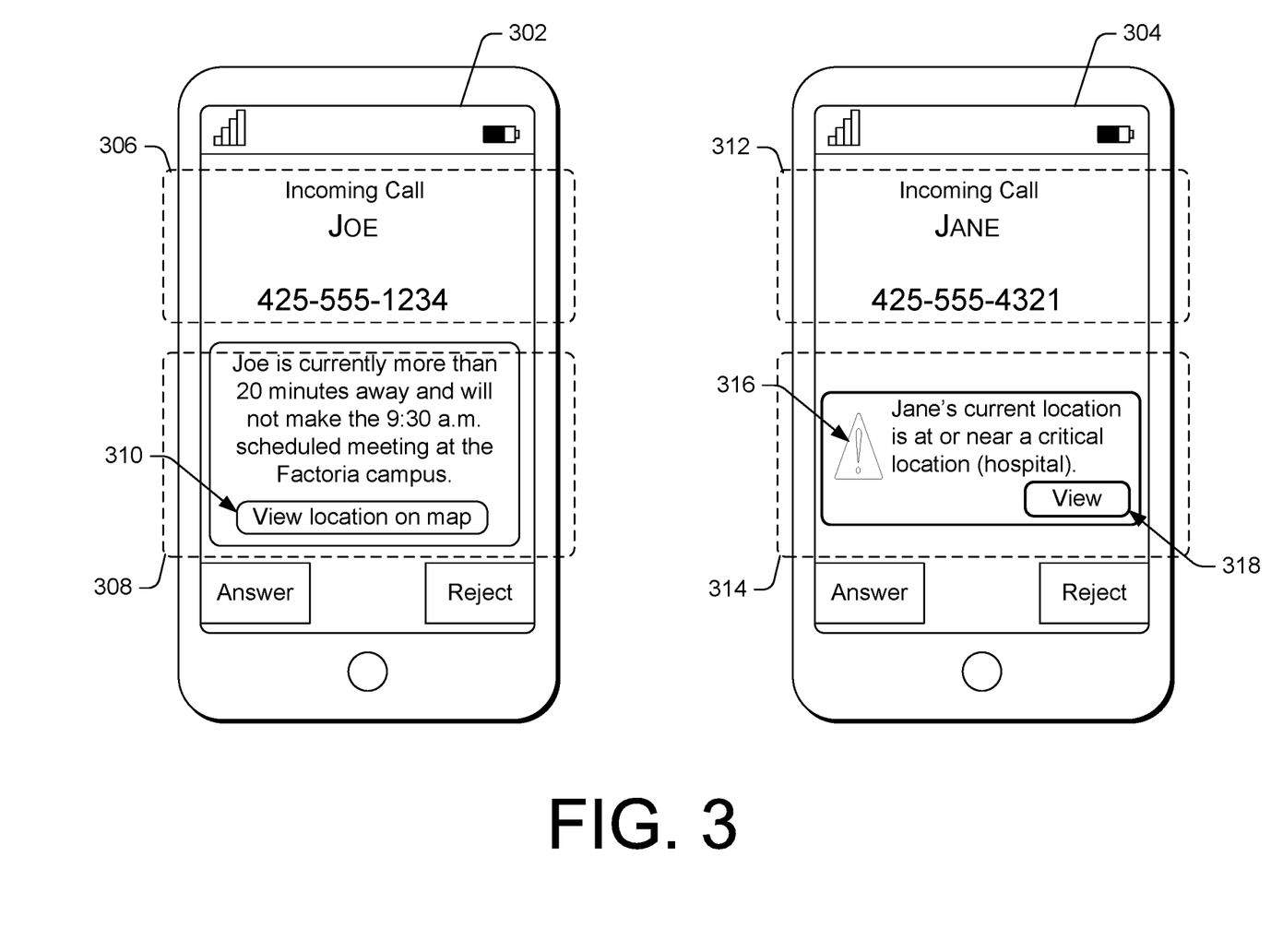
FIG. 3 shows example user interfaces displayed on a recipient device of a call recipient, in which the user interfaces present contextual information for incoming calls.

FIG. 3 shows example user interfaces displayed on a recipient device of a call recipient, in which the user interfaces present contextual information for incoming calls. The user interfaces include a user interface 302 and a user interface 304. The example user interface 302 may display an incoming call notification 306 that shows caller identification information of the caller. The user interface 302 may further display contextual information 308 that is associated with the incoming call. In this example, the contextual information 308 may include a selectable option 310 that enables the call recipient to view a current geolocation of the caller on a map.

Likewise, the example user interface 304 may display an incoming call notification 312 that shows caller identification information of the caller. The user interface 304 may further display contextual information 314 that shows the caller is currently located in an alert critical area. In such an instance, the contextual information may be accompanied by an alert indicator 316 that draws the attention of the call recipient to the contextual information. Further, the contextual information 314 may include a selectable option 318 that enables the call recipient to view a current geolocation of the caller on a map.

Example Processes

Figure 4:
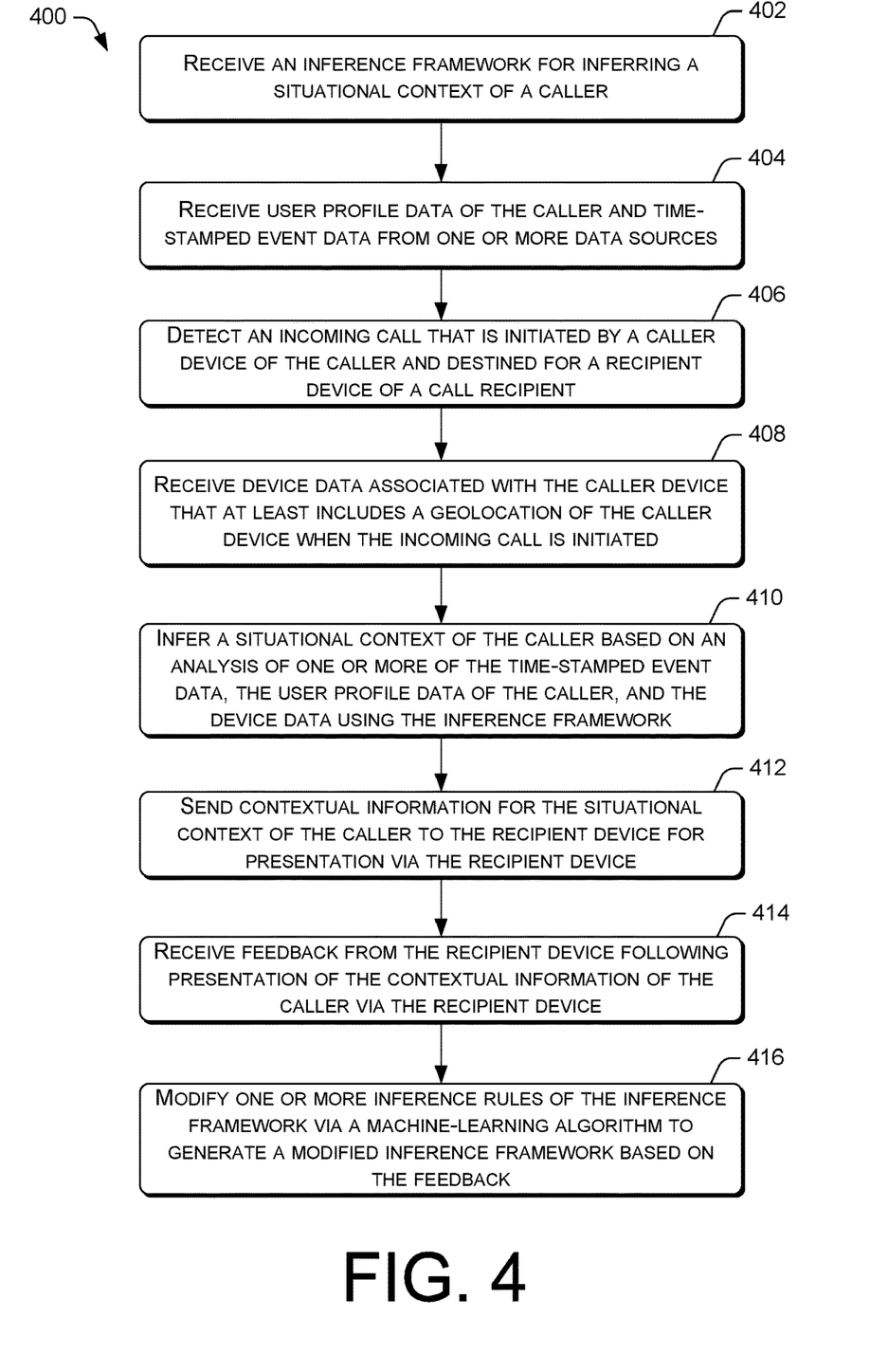
FIG. 4 is a flow diagram of an example process for generating a situational context for an incoming call made from a caller device and providing the situational context to a recipient device.
Figure 5:
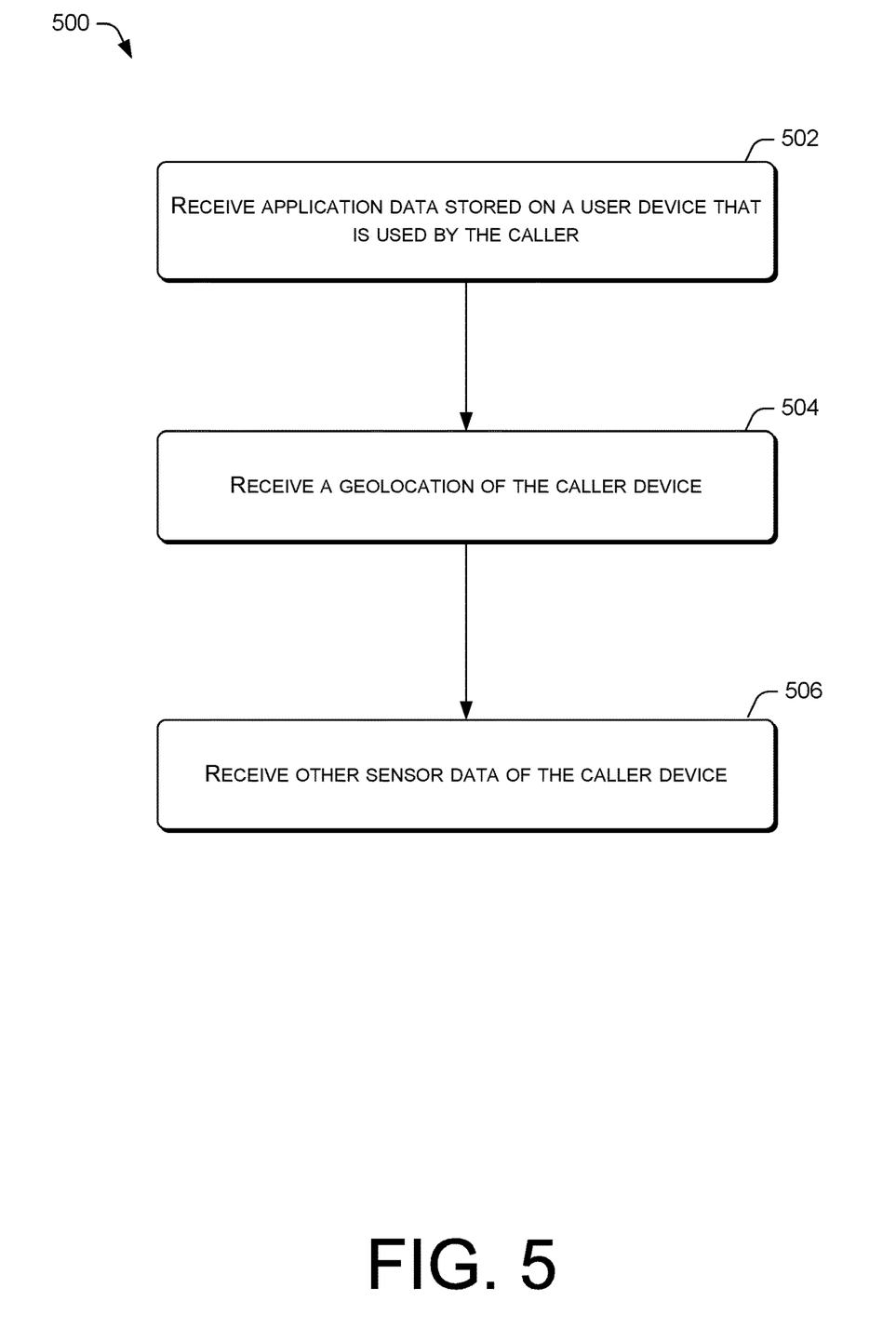
FIG. 5 is a flow diagram of an example process for receiving device data of a caller device that initiates an incoming call to a recipient device, in which the device data is used to infer a situational context for the incoming call.

FIGS. 4 and 5 present illustrative processes 400 and 500 for using a contextual inference platform to generate a situational context for an incoming call from a caller device to a recipient device. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the architecture 100 of FIG. 1.

FIG. 4 is a flow diagram of an example process 400 for generating a situational context for an incoming call made from a caller device and providing the situational context to a recipient device. At block 402, the contextual inference platform 118 of the wireless carrier network 102 may receive an inference framework for inferring a situational context of a caller. In various embodiments, the inference framework may contain one or more inference rules for analyzing data from the multiple data sources to determine the situational context for an incoming call initiated by the caller. The inference rules may include rules that are manually inputted by a user, rules that have been developed via machine-learning, e.g., supervised learning based on training data, and/or so forth.

At block 404, the contextual inference platform 118 may receive user profile data of the caller and time-stamped event data from one or more data sources. In various embodiments, the user profile data may include demographic characteristics of the caller, social relationship information of the caller, subscriber information of the caller with respect to the wireless carrier network, and/or so forth. The time-stamped event data may include news events, weather events, traffic events, social media events, etc. that are available from various data sources. Such data sources may include online portals, digital information feeds, web-based services, etc. that are operated by governmental agencies, news service organizations, private organizations, social media platforms, etc.

At block 406, the contextual inference platform 118 may detect an incoming call that is initiated by a caller device of the caller and destined for a recipient device of a call recipient. In various embodiments, the contextual inference platform 118 may be notified by the core network 104 of the wireless carrier network 102 that an incoming call is initiated at the caller device. At block 408, the contextual inference platform 118 may receive data associated with the caller device that at least includes a geolocation of the caller device when the incoming call is initiated. In various embodiments, the contextual inference platform 118 may initiate a retrieval of the device data from the caller device following the initiation of the incoming call.

At block 410, the contextual inference platform 118 may infer a situational context of the caller based on an analysis of the one or more of the time-stamped event data, the user profile data of the caller, and the device data using the inference framework. The inference may be made in response to the initiation of the incoming call. In various embodiments, the contextual inference platform may apply the inference framework via a logical computing algorithm, a cognitive network algorithm, a machine-learning algorithm, and/or a statistical modeling algorithm to the data relevant to the caller. For example, some of the inference rules in the inference framework may assign a statistical weight to a certain time-stamped event, sensor data related to the caller, or a user characteristic in the user profile data of the caller. Other inference rules in the inference framework may rank the relevance of some data based on the existence of other data.

At block 412, the contextual inference platform 118 may send contextual information for the situational context of the caller to the recipient device for presentation via the recipient device. In various embodiments, the contextual inference platform 118 may direct a core network 104 of the wireless carrier network 102 to deliver the contextual information along with an incoming call notification to the recipient device. The contextual information may include the geolocation of the caller device, data pertaining to one or more time-stamped events (e.g., weather event, news event, etc.) that have been determined by the contextual inference platform 118 to be related to the incoming call, and/or conclusions reached by the platform with respect to the incoming call.

At block 414, the contextual inference platform 118 may receive feedback from the recipient device following the presentation of the situational context of the caller via the recipient device. The feedback may include whether the call recipient answered the incoming call at the recipient device after receiving the contextual information. Alternatively, or concurrently, the feedback may include a call recipient inputted rating of the usefulness and/or accuracy of the contextual information.

At block 416, the contextual inference platform 118 may modify one or more inference rules of the inference framework via a machine-learning algorithm to generate a modified inference framework based on the feedback. In some instances, the adjustment involves adjusting the statistical weights that are assigned to different data by the inference rules. In other instances, an inference rule may be modified to assign a higher relevance rank to a piece of data when a second additional piece of data is detected instead of a first piece of additional data. Subsequently, the process 400 may loop back to 404, so that at least one of the time-stamped event data, the user profile data, and the device data may be updated with additional data. In this way, an additional situational context may be inferred for another incoming call that is initiated by the caller device of the caller and destined for the recipient device or another recipient device of another call recipient.

FIG. 5 is a flow diagram of an example process 500 for receiving device data of a caller device that initiates an incoming call to a recipient device, in which the device data is used to infer a situational context for the incoming call. The example process 500 may further describe block 408 of the example process 400. At block 502, the contextual inference platform 118 may receive application data stored on a user device that is used by the caller. In various embodiments, the application data parameters may include calendar, schedule, appointment, and/or itinerary parameters of the caller. The application data may be stored by an operating system of the caller device, by native applications that are built into the software environment of the caller device, by the one or more over-the-top (OTT) applications that are executed in the software environment, and/or so forth. Such application data may be periodically received by the contextual inference platform 118 or received by the contextual inference platform 118 in response to the caller device initiating an incoming call to a recipient device.

At block 504, the contextual inference platform 118 may receive a geolocation of the caller device. At block 506, the contextual inference platform 118 may receive other sensor data of the caller device. Such sensor data may include device movement of the caller device, device acceleration of the caller device, biometric information of the caller detected by the caller device, such as pulse rate, blood pressure, body temperature, ambient air temperature, etc. In various embodiments, such sensor data may be periodically received by the contextual inference platform 118 or received by the contextual inference platform 118 in response to the caller device initiating an incoming call to a recipient device.

The use of the contextual inference platform to provide context information of an incoming call to a call recipient may enable the call recipient to make a more informed decision as to the importance of the incoming call, the potential subject matter of the incoming call, and whether to reject or to answer the incoming call from the caller. The provision of such useful contextual information to the call recipient may increase user satisfaction of the call recipient with a mobile network operator (MNO) that operates the wireless carrier network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving user profile data of a caller and time-stamped event data from one or more data sources;

detecting an incoming call initiated by a caller device of the caller that is destined for a recipient device of a call recipient;

receiving device data associated with the caller device that at least includes a geolocation of the caller device;

applying, in response to an initiation of the incoming call, an inference framework to infer a situational context of the caller based on an analysis of the time-stamped event data, the user profile data of the caller, and the device data, the inference framework including one or more inference rules, the one or more inference rules including an inference rule that ranks a particular user characteristic of the caller included in the user profile data as being of higher relevance for inferring the situational context than the device data associated with the caller device when the incoming call is initiated at a geolocation within an area designated by at least one of the caller or the call recipient of the recipient device as an alert critical area;

sending contextual information for the situational context of the caller to the recipient device for presentation to the call recipient via the recipient device;

receiving feedback of the call recipient from the recipient device following the presentation of the contextual information of the caller; and modifying, based on the feedback received from the recipient device, the one or more inference rules of the inference framework used to infer contextual information for incoming calls from callers via a machine-learning algorithm to generate a modified inference framework.

2. The one or more non-transitory computer-readable media of claim 1, wherein the one or more inference rules include at least one manually inputted inference rule or a machine-learning developed rule.

3. The one or more non-transitory computer-readable media of claim 1, wherein the device data includes at least one of sensor data detected by one or more sensors of the caller device or application data provided by one or more applications of the caller device.

4. The one or more non-transitory computer-readable media of claim 3, wherein the application data includes at least one of a calendar parameter, a schedule parameter, or an appointment parameter.

5. The one or more non-transitory computer-readable media of claim 3, wherein the sensor data includes at least one of temperature data at the geolocation, movement data of the recipient device, acceleration data of the recipient device, or biometric data of the call recipient.

6. The one or more non-transitory computer-readable media of claim 1, wherein time-stamped event data includes data for at least one of a news event, a social media event, a traffic event, or a weather event.

7. The one or more non-transitory computer-readable media of claim 1, wherein the contextual information includes at least one of the geolocation of the caller device, a time-stamped event associated with the incoming call, or a conclusion reached with respect to the incoming call.

8. The one or more non-transitory computer-readable media of claim 1, wherein applying the inference framework includes applying the inference framework via at least one of a logical computing algorithm, a cognitive network algorithm, a machine-learning algorithm, or a statistical modeling algorithm.

9. The one or more non-transitory computer-readable media of claim 1, wherein the sending includes sending the contextual information along with an incoming call notification of the incoming call to the recipient device.

10. The one or more non-transitory computer-readable media of claim 1, wherein the feedback includes at least one of whether the call recipient answered the incoming call at the recipient device after contextual information is received at the recipient device or an inputted rating of the contextual information received at the recipient device, the inputting rating being a usefulness or an accuracy rating of the contextual information.

11. The one or more non-transitory computer-readable media of claim 1, further comprising:
   detecting an additional incoming call initiated by the caller device of the caller that is destined for the recipient device of the call recipient or an additional recipient device of an additional call recipient; and
   inferring an additional situational context of the caller based on an additional analysis of the time-stamped event data, the user profile data, and the device data using the modified inference framework, wherein at least one of time-stamped event data, the user profile data, and the device data is updated with additional data.

12. A computer-implemented method, comprising:
   receiving, at a contextual inference platform executing on one more computing devices, user profile data of a caller and time-stamped event data from one or more data sources;
   detecting, at the contextual inference platform, an incoming call initiated by a caller device of the caller that is destined for a recipient device of a call recipient;
   receiving, at the contextual inference platform, device data associated with the caller device that at least includes a geolocation of the caller device;
   applying, in response to an initiation of the incoming call, an inference framework via the contextual inference platform to infer a situational context of the caller based on an analysis of the time-stamped event data, the user profile data of the caller, and the device data, the inference framework including one or more inference rules, the one or more inference rules including an inference rule that ranks a particular time-stamped event associated with a geographical location as being of higher relevance for inferring the situational context than other time-stamped events when the incoming call is initiated within a predetermined distance of the geographical location;
   sending, via the contextual inference platform, contextual information for the situational context of the caller to the recipient device for presentation to the call recipient via the recipient device;
   receiving, at the contextual inference platform, feedback of the call recipient from the recipient device following the presentation of the contextual information of the caller; and
   modifying, via the contextual inference platform, the one or more inference rules of the inference framework used to infer the contextual information for incoming calls from callers via a machine-learning algorithm to generate a modified inference framework based on the feedback received from the recipient device.

13. The computer-implemented method of claim 12, wherein the modifying the one or more inference rules includes increasing or decreasing a rank value or a statistical weight value assigned to a time-stamped event, a user characteristic in the user profile data of the caller, or a device data parameter in the device data of the caller device by at least one inference rule.

14. The computer-implemented method of claim 12, wherein the one or more inference rules include an additional inference rule that ranks a relevance of a first piece of data based on whether one or more other pieces of data fit historical trends.

15. The computer-implemented method of claim 12, wherein the one or more inference rules include an additional inference rule that ranks a particular user characteristic of the caller as being of higher relevance for inferring the situational context than the device data associated with the caller device when the incoming call is initiated at a geolocation that is within an area designated by at least one of the caller or the call recipient of the recipient device as an alert critical area.

16. The computer-implemented method of claim 12, wherein inferring the situational context includes at least one of selecting a time-stamped event for presentation on the recipient device based on a relevance rank value of the time-stamped event being higher than at least one relevance rank value of one or more other time-stamped events, or selecting a conclusion for presentation on the recipient device based on a confidence value of the conclusion being higher than at least one confidence value of one or more other conclusions.

17. A system, comprising:
   one or more processors; and
   memory including a plurality of computer-executable components that are executable by the one or more processors to perform a plurality of actions, the plurality of actions comprising:
      receiving user profile data of a caller and time-stamped event data from one or more data sources;
      detecting an incoming call initiated by a caller device of the caller that is destined for a recipient device of a call recipient;
      receiving device data associated with the caller device that at least includes a geolocation of the caller device;
      applying, in response to an initiation of the incoming call, an inference framework to infer a situational context of the caller based on an analysis of the time-stamped event data, the user profile data of the caller, and the device data, the inference framework including one or more inference rules, the one or more inference rules including an inference rule that ranks a particular user characteristic of the caller included in the user profile data as being of higher relevance for inferring the situational context than the device data associated with the caller device when the incoming call is initiated at a geolocation within an area designated by at least one of the caller or the call recipient of the recipient device as an alert critical area; and
      sending contextual information for the situational context of the caller to the recipient device for presentation to the call recipient via the recipient device.

18. The system of claim 17, wherein the contextual information includes at least one of the geolocation of the caller device, a time-stamped event associated with the incoming call, or a conclusion reached with respect to the incoming call.

19. The system of claim 17, wherein applying the inference framework includes applying the inference framework via at least one of a logical computing algorithm, a cognitive network algorithm, a machine-learning algorithm, or a statistical modeling algorithm.

20. The system of claim 17, wherein the sending includes sending the contextual information along with an incoming call notification of the incoming call to the recipient device such that the incoming call notification is presented by a native client application of the recipient device and the contextual information is presented by a third-party client application of the recipient device.

\* \* \* \* \*